United States Patent
Bhargava et al.

(10) Patent No.: US 11,728,718 B2
(45) Date of Patent: Aug. 15, 2023

(54) BINARY MOTOR FOR INDEPENDENT OPERATION OF MULTIPLE COMPONENTS WITHIN AN APPLIANCE

(71) Applicant: WHIRLPOOL CORPORATION, Benton Harbor, MI (US)

(72) Inventors: Krati Bhargava, Stevensville, MI (US); Fang Deng, Novi, MI (US); James Hull, St. Joseph, MI (US); Jagtanand More, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 323 days.

(21) Appl. No.: 17/175,880

(22) Filed: Feb. 15, 2021

(65) Prior Publication Data

US 2021/0320581 A1 Oct. 14, 2021

Related U.S. Application Data

(60) Provisional application No. 63/009,653, filed on Apr. 14, 2020.

(51) Int. Cl.
*H02K 51/00* (2006.01)
*D06F 37/20* (2006.01)
*D06F 37/30* (2020.01)
*H02K 7/116* (2006.01)
*H02K 7/14* (2006.01)

(52) U.S. Cl.
CPC .......... *H02K 51/00* (2013.01); *D06F 37/206* (2013.01); *D06F 37/304* (2013.01); *H02K 7/116* (2013.01); *H02K 7/14* (2013.01)

(58) Field of Classification Search
CPC ....................................... H02K 51/00
See application file for complete search history.

(56) References Cited

U.S. PATENT DOCUMENTS

| 2,056,833 A | 10/1936 | Davis |
| 2,902,850 A | 9/1959 | Sheffer |
| 3,583,182 A | 6/1971 | Matsura |
| 2018/0355540 A1 | 12/2018 | Jeoung et al. |

FOREIGN PATENT DOCUMENTS

| CN | 2611408 | 4/2004 |
| CN | 108677453 | 10/2018 |
| EP | 2395144 | 12/2011 |
| EP | 3309288 | 4/2018 |
| GB | 985854 | 3/1965 |

*Primary Examiner* — Jason Y Ko
(74) *Attorney, Agent, or Firm* — Price Heneveld LLP (57) ABSTRACT

A laundry appliance includes a drum rotationally positioned within a structural cabinet. An impeller is rotationally positioned within the drum. The impeller is selectively and independently operable with respect to the drum. A binary motor has a first motor and a second motor disposed within a common housing. A first drive belt extends between the first motor and the drum. A second drive belt extends between the second motor and the impeller. The first and second motors engage the first and second drive belts on a belt side of the common housing.

20 Claims, 11 Drawing Sheets

FIG. 13

BINARY MOTOR FOR INDEPENDENT OPERATION OF MULTIPLE COMPONENTS WITHIN AN APPLIANCE

CROSS-REFERENCE TO RELATED APPLICATION

This application claims priority to and the benefit under 35 U.S.C. § 119(e) of U.S. Provisional Patent Application No. 63/009,653, filed on Apr. 14, 2020, entitled BINARY MOTOR FOR INDEPENDENT OPERATION OF MULTIPLE COMPONENTS WITHIN AN APPLIANCE, the entire disclosure of which is hereby incorporated herein by reference.

FIELD OF THE DEVICE

The device is in the field of motors that are incorporated within appliances, and more specifically, a binary motor for use in an appliance, such as a laundry appliance, for operating a rotating drum and a rotating impeller to allow for independent and selective operation of these components.

BRIEF SUMMARY OF THE DEVICE

According to one aspect of the present disclosure, a laundry appliance includes a drum rotationally positioned within a structural cabinet. An impeller is rotationally positioned within the drum. The impeller is selectively and independently operable with respect to the drum. A binary motor has a first motor and a second motor disposed within a common housing. A first drive belt extends between the first motor and the drum. A second drive belt extends between the second motor and the impeller. The first and second motors engage the first and second drive belts on a belt side of the common housing.

According to another aspect of the present disclosure, a laundry appliance includes a drum rotationally positioned within a structural cabinet. An impeller is rotationally positioned within the drum. The impeller is selectively and independently operable with respect to the drum. A binary motor includes a first motor and a second motor disposed within a common housing. A first drive belt extends between the first motor and the drum. A second drive belt extends between the second motor and the impeller. First and second drive shafts of the first and second motors extend from opposing sides of the common housing. The first and second drive belts are each positioned on a belt side of the common housing. A transfer shaft extends through the common housing and couples the second drive shaft with the second drive belt.

According to yet another aspect of the present disclosure, a motor for a laundry appliance includes a first stator positioned within a common housing proximate a belt side of the common housing. A first drive assembly includes a first rotor and a first drive shaft that extends from the belt side of the common housing. The first drive shaft is configured to engage a first drive belt. A second stator is positioned within the common housing proximate an opposing side of the common housing. A second drive assembly includes a second rotor and a second drive shaft that extends from the second rotor. The second drive assembly is configured to engage a second drive belt proximate the belt side of the common housing.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to a laundry appliance that incorporates a binary motor for operating a rotating drum and an impeller via separate belt drives that are coupled to the binary motor. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
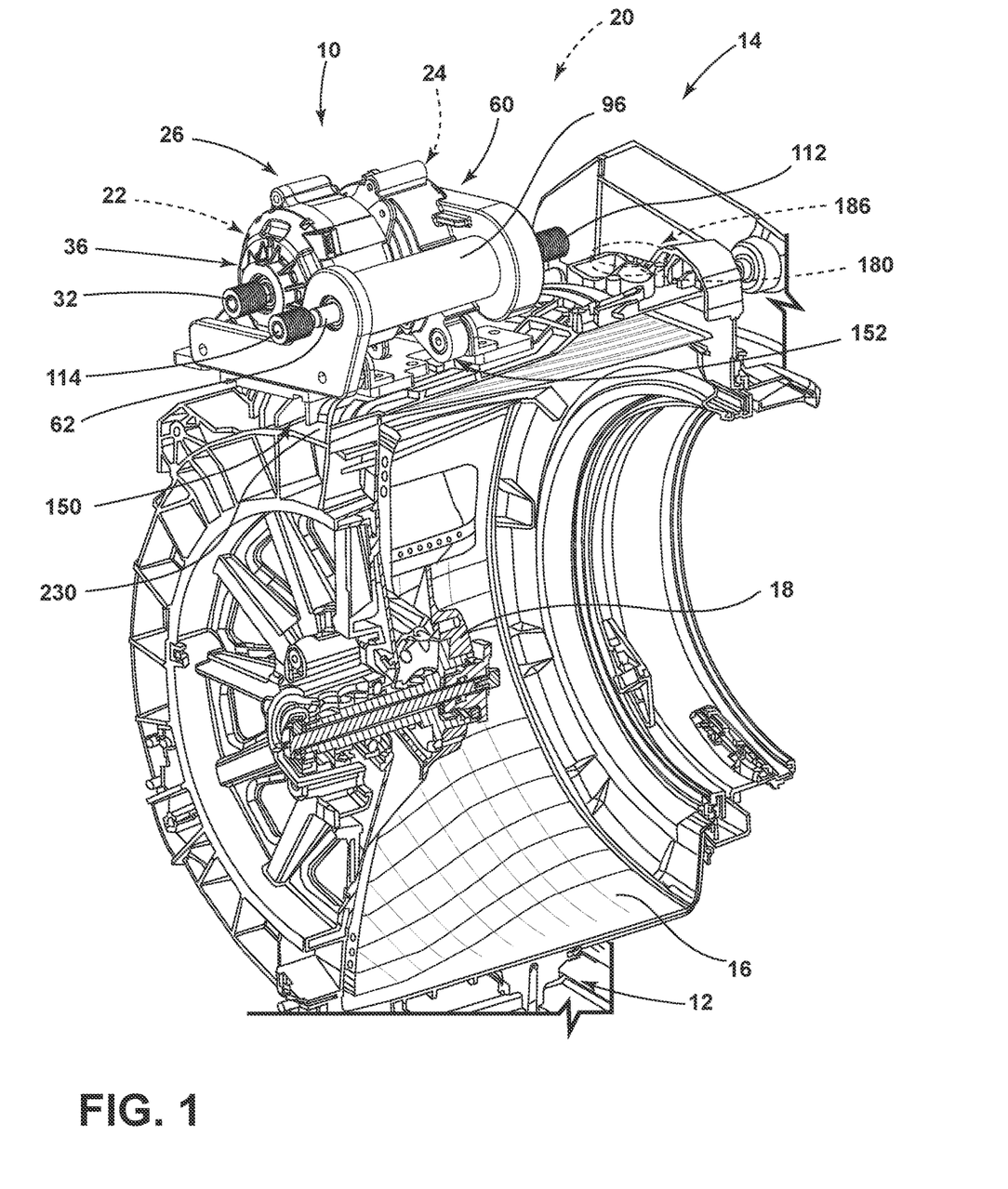
FIG. 1 is a cross-sectional perspective view of a laundry appliance that incorporates an aspect of the binary motor for operating the rotating drum and the impeller.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
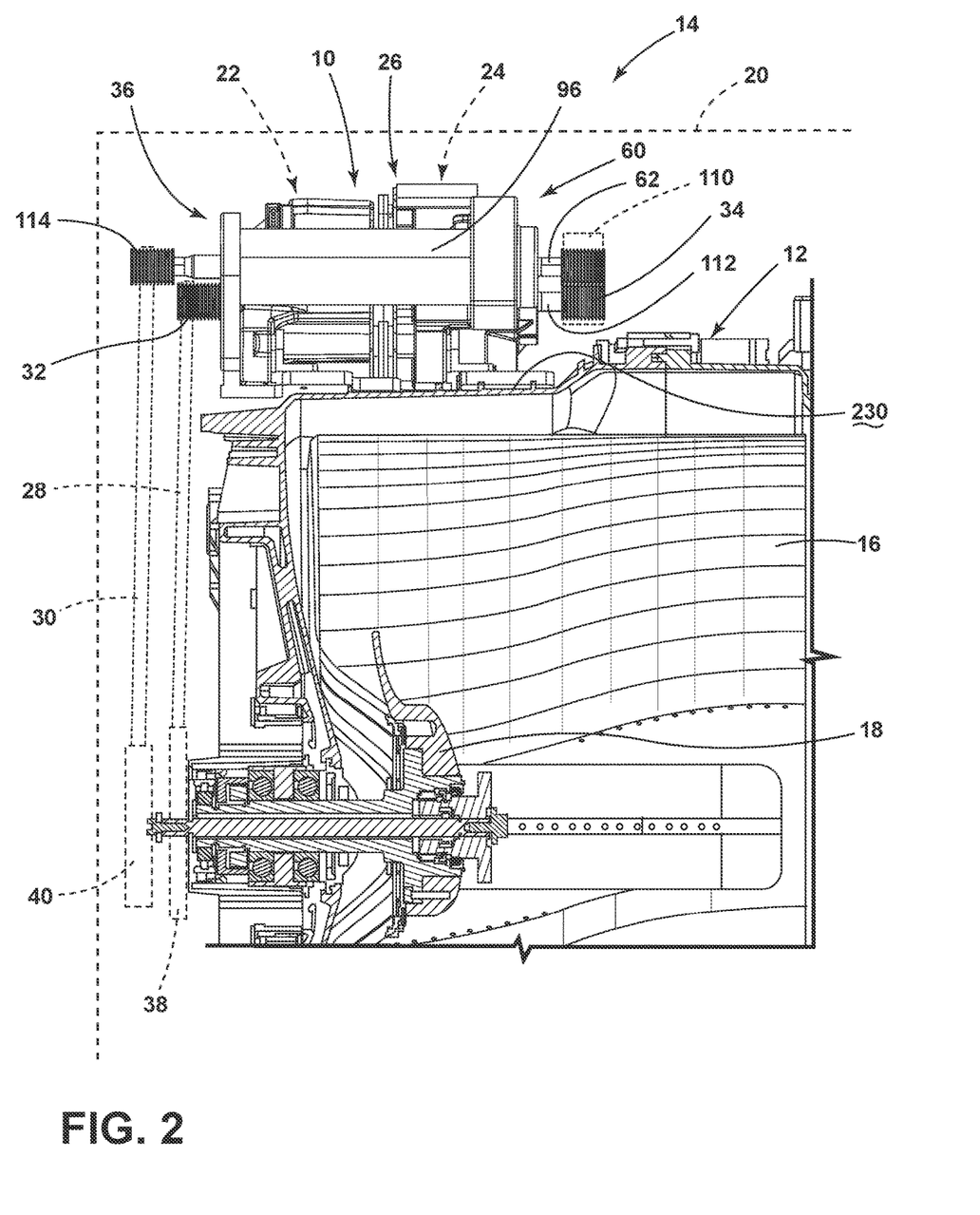
FIG. 2 is an enlarged cross-sectional view of a laundry appliance of FIG. 1.
Figure 3:
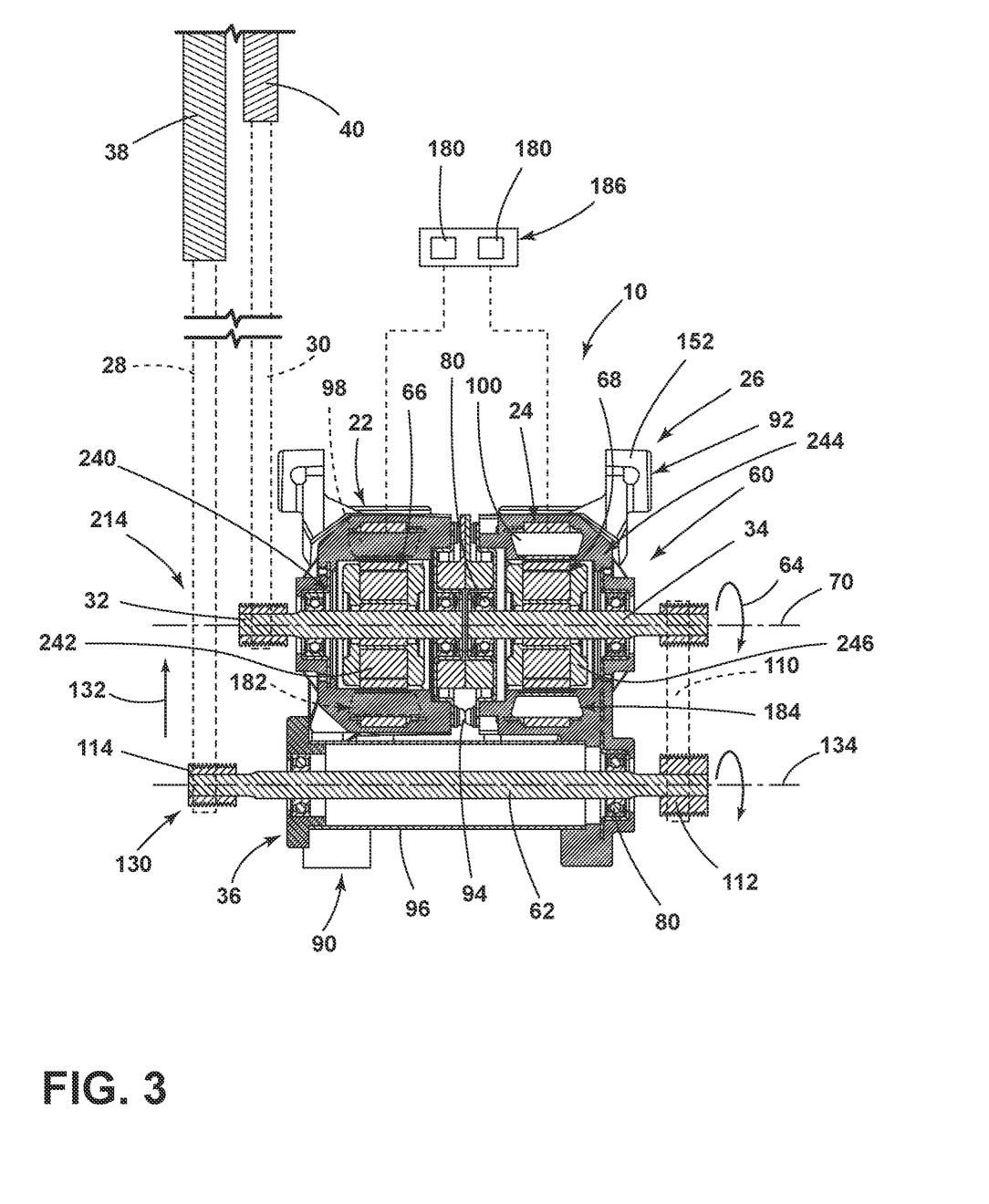
FIG. 3 is a cross-sectional view of an aspect of the binary motor that incorporates a transfer shaft for redirecting the rotational motion of one of the internal motors of the binary motor.

With respect to FIGS. 1-3, reference numeral 10 generally refers to a binary motor that is coupled to a tub 12 for a laundry appliance 14, and where the binary motor 10 operates at least two separate components of the laundry appliance 14, typically a drum 16 and an impeller 18. The binary motor 10 includes internal motors that independently and selectively operate the drum 16 and the impeller 18 at independent speeds and independent rotational directions. According to various aspects of the device, the laundry appliance 14 includes a tub 12 that is positioned within a structural cabinet 20. The drum 16 is rotationally positioned within the tub 12. The impeller 18 is rotationally positioned within the drum 16, where the impeller 18 is selectively and independently operable with respect to the drum 16 and the tub 12. The binary motor 10 includes a first motor 22 and a second motor 24 that are disposed within a common housing 26. A first drive belt 28 extends between the first motor 22 and the drum 16. A second drive belt 30 extends between the second motor 24 and the impeller 18. The first and second motors 22, 24 are positioned such that respective first and second drive shafts 32, 34 of the first and second motors 22, 24 are parallel with one another and extend in opposing directions. In this manner, the first and second drive shafts 32, 34 engage the first and second drive belts 28, 30, respectively. The first and second drive belts 28, 30 are positioned on the same belt side 36 of the common housing 26 for the binary motor 10. In this manner, the binary motor 10 can be coupled to the tub 12 and the first and second drive belts 28, 30 can extend between the binary motor 10 and first and second drive rotors 38, 40 for each of the drum 16 and the impeller 18, respectively. The binary motor 10 can be coupled with the tub 12 at various locations around the outer surface 230 of the tub 12. Accordingly, the binary motor 10 can be positioned above, below or laterally adjacent to the first and second drive rotors 38, 40.

Referring again to FIGS. 1-3, the binary motor 10 is a belt drive motor that is typically attached to the tub 12. The first and second drive belts 28, 30 are positioned rearward of the tub 12 so that each of the first and second drive belts 28, 30 can extend from the binary motor 10 to the first and second drive rotors 38, 40 for operation of the drum 16 and impeller 18, respectively. As discussed above and as shown in FIGS. 1-3, the first and second motors 22, 24 are positioned in a back-to-back configuration and the first drive shaft 32 extends in the opposite direction of the second drive shaft 34. In certain aspects of the device having this back-to-back configuration of the first and second motors 22, 24, the first drive shaft 32 extends from the belt side 36 of the common housing 26 and the second drive shaft 34 extends from an opposing side 60 of the common housing 26. To allow for the second drive shaft 34 to engage the second drive belt 30, a transfer shaft 62 is incorporated within the common housing 26 to translate the rotational motion 64 from the second drive shaft 34 from the opposing side 60 of the common housing 26 to the belt side 36 of the common housing 26. In this manner, each of the first and second drive belts 28, 30 can engage the binary motor 10 on the belt side 36 of the common housing 26.

Referring again to FIGS. 1-3, the binary motor 10 includes first and second motors 22, 24 that include first and second rotor and stator pairs 66, 68. First and second rotor and stator pairs 66, 68 are positioned back-to-back with respect to one another and the first and second drive shafts 32, 34 extend along a common rotational axis 70 and in opposite directions. The second drive shaft 34, in order to engage the second drive belt 30 on the belt side 36 of the common housing 26, utilizes the transfer shaft 62 that extends through a portion of the common housing 26. Various bearings 80 are included within the common housing 26 for stabilizing the rotational motion 64 of the first and second drive shafts 32, 34, as well as the transfer shaft 62. These bearings 80 also serve to axially secure the first and second drive shafts 32, 34 and the transfer shaft 62 to the common housing 26, while allowing for rotational motion 64 of each of these components.

Referring again to FIG. 3, the common housing 26 can include opposing portions that are coupled together via various attachment mechanisms and methods. In such an embodiment, the common housing 26 can include a first portion 90 that houses the first rotor and stator pair 66 and a second portion 92 that houses the second rotor and stator pair 68. The first and second portions 90, 92 of the common housing 26 are coupled together, typically via fasteners 94, such that the first and second drive shafts 32, 34 are aligned along the common rotational axis 70 and extends from the belt side 36 and the opposing sides 60, respectively, of the common housing 26. To further secure the first and second portions 90, 92 of the common housing 26 together, a transfer housing 96 can extend between the first and second portions 90, 92 and also surround, at least partially, portions of the transfer shaft 62. The transfer housing 96 can include a structural sleeve that extends between the first and second portions 90, 92 of the common housing 26, where the sleeve helps to position the first and second portions 90, 92 of the common housing 26 with respect to one another, and also serves to position the transfer shaft 62 in a stable position with respect to the second drive shaft 34. In this manner, each of the first and second portions 90, 92 of the common housing 26 can at least partially surround the transfer housing 96. The transfer housing 96 helps to position the first and second portions 90, 92 into proper alignment to support the first and second rotor and stator pairs 66, 68 and the first and second drive shafts 32, 34. The first and second portions 90, 92 of the common housing 26, in turn, support the position of the transfer housing 96 and the transfer shaft 62.

Referring again to FIG. 3, the first and second rotor and stator pairs 66, 68 can be disposed within the respective first and second portions 90, 92 of the common housing 26 via various methods and mechanisms. According to various aspects of the device, the first and second stators 98, 100 of the first and second rotor and stator pairs 66, 68 can be insert injection-molded within the first and second portions 90, 92, respectively, of the common housing 26. The remaining components of the first and second rotor and stator pairs 66, 68 can then be installed within the first and second portions 90, 92. The first and second portions 90, 92 of the common housing 26 can then be attached together via fasteners 94, welding, and other methods and mechanisms to form the common housing 26 for the binary motor 10. It is also contemplated that the first and second stators 98, 100 can be fastened, press fit, or otherwise attached to the first and second portions 90, 92 of the common housing 26.

Referring again to FIG. 3, the second drive shaft 34 and the transfer shaft 62 can be coupled together via a transfer belt 110 that extends therebetween. Accordingly, during operation of the second motor 24 and the second drive shaft 34, the second drive shaft 34 rotationally operates the transfer belt 110. The transfer belt 110 delivers this rotational motion 64 to the transfer shaft 62. The transfer shaft 62, which extends through the common housing 26, allows the rotational motion 64 of the second drive shaft 34 to be delivered from the opposing side 60 of the common housing 26 to the belt side 36. Through this configuration, the transfer shaft 62 includes a receiving end 112 that is positioned proximate the second drive shaft 34, and a delivery end 114 that engages the second drive belt 30. The delivery end 114 of the transfer shaft 62 is positioned on the belt side 36 of the common housing 26 near the first drive shaft 32 that operates the first drive belt 28. Through this configuration of the first and second drive shafts 32, 34 and the transfer shaft 62, rotational operation of the back-to-back first and second motors 22, 24 can be delivered to the drum 16 and the impeller 18 from the belt side 36 of the common housing 26. Accordingly, a compact configuration of the binary motor 10 can be utilized for efficiently delivering rotational motion 64 from the binary motor 10 to the drum 16 and the impeller 18. In addition, this configuration provides for a close and slightly offset configuration of the first and second drive belts 28, 30 for operating the drum 16 and the impeller 18, respectively. This configuration provides a compact configuration that uses a relatively small amount of space between the tub 12 and the structural cabinet 20.

Referring again to FIG. 3, the receiving and delivery ends 112, 114 of the transfer shaft 62 can be differently sized. Typically, the receiving end 112 is configured to have a larger outside diameter than that of the delivery end 114. By using different-sized receiving and delivery ends 112, 114 of the transfer shaft 62, the transfer shaft 62 can define a gear reduction mechanism 130 that provides a greater torque output 132 for operating the impeller 18 for the laundry appliance 14. Typically, with respect to horizontal axis (HA) laundry appliances 14, a greater torque output 132 is utilized through the second drive belt 30 for operation of the impeller 18 than the output torque of the first drive belt 28 for operation of the rotating drum 16. Accordingly, utilizing the gear reduction mechanism 130 of the transfer shaft 62, the second motor 24 can be a size that is similar to that of the first motor 22, while providing a greater output torque for operating the impeller 18. Typically, the first and second drive shafts 32, 34 operate about the common rotational axis 70. The transfer shaft 62 operates along a transfer rotational axis 134 that is parallel with and offset from the common rotational axis 70 of the first and second drive shafts 32, 34. Again, this configuration allows the rotational motion 64 from the second drive shaft 34 to be transferred from the opposing side 60 of the common housing 26 to the belt side 36 of the common housing 26 next to the first drive shaft 32. While the binary motor 10 is described herein as being utilized fora HA laundry appliance 14, it should be understood that the binary motor 10 can also be utilized in other laundry appliance configurations that can include vertical axis machines and angular axis machines.

Referring again to FIGS. 1-3, the binary motor 10 can be utilized as an aftermarket component for replacement of conventional single drive motors, or for replacement of a conventional belt-drive motor or a direct drive motor. Additionally, because of the use of the transfer shaft 62 and the compact nature of the binary motor 10, a single mounting structure 150 of the tub 12 can be used for attaching the binary motor 10 to the tub 12. Accordingly, the mounting bracket 152 of the binary motor 10 can be used with the mounting structure 150 of the tub 12 without using additional adapters or other intermediary mounting devices. Because the binary motor 10 is more efficient and compact when compared to a dual direct drive motor, or conventional direct drive motor, smaller space is required between the cabinet 20 and the tub 12 for locating the binary motor 10. The use of the binary motor 10 is typically more cost-effective in terms of overall cost of manufacturing the binary motor 10 as well as assembly and maintenance costs.

Figure 11:
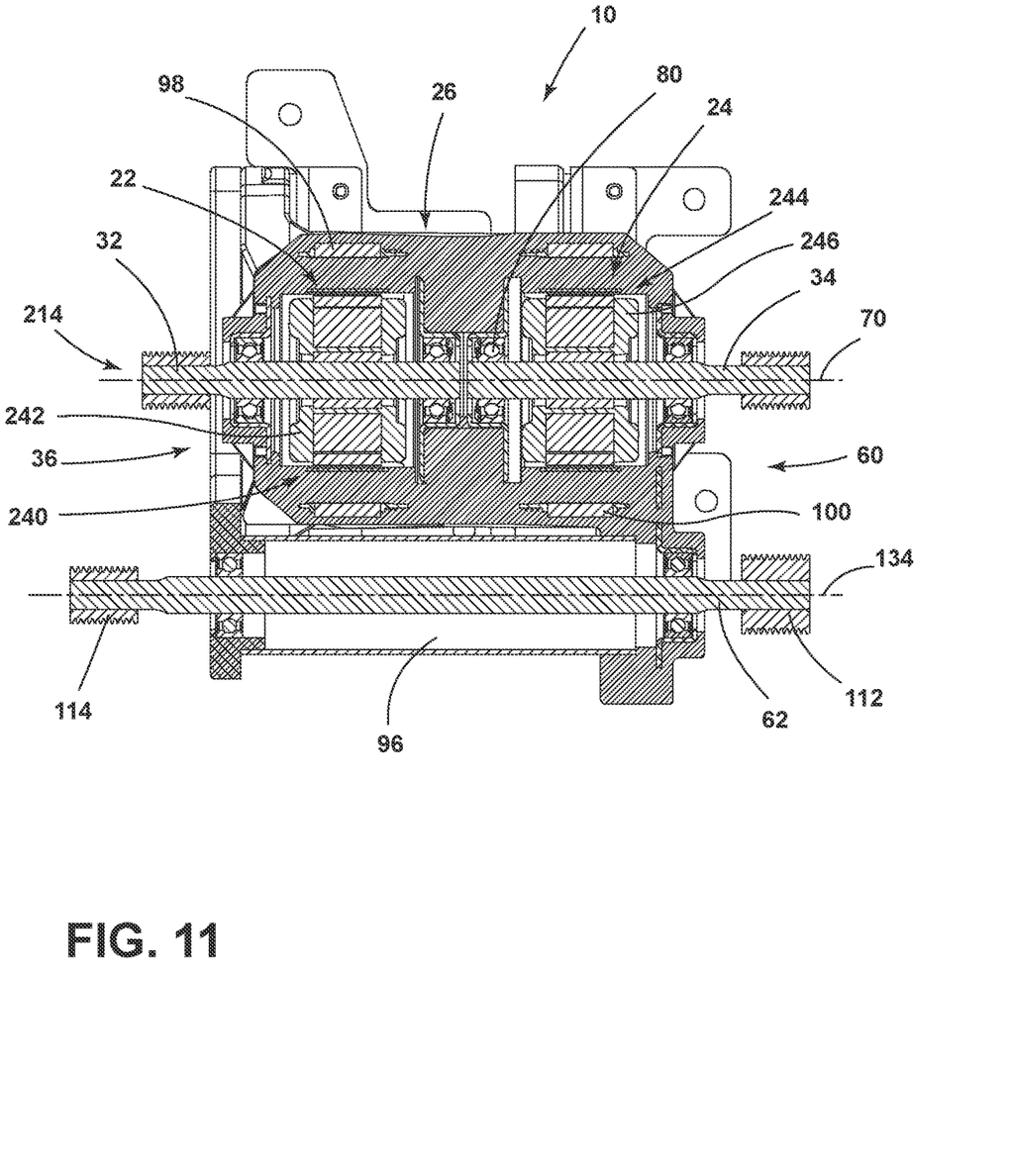
FIG. 11 is a cross-sectional view of an aspect of the binary motor having a single continuous common housing.

Referring now to FIG. 11, it is contemplated that the binary motor 10 utilizing the transfer shaft 62 can include a common housing 26 that is a single and continuous piece that extends around each of the first and second motors 22, 24 and the transfer housing 96, or portions thereof. In such an aspect of the device, the first and second stators 98, 100, the transfer housing 96 and other components of the binary motor 10 can be insert injection molded into the common housing 26. These components can also be press fit or attached to the common housing 26. After formation of the common housing 26, the remainder of the components of the first and second motors 22, 24 and the transfer shaft 62 can be installed. The operation of the binary motor 10, when installed within the appliance 14 and attached to the first and second drive rotors 38, 40, is largely similar when compared with the common housing 26 having the first and second portions 90, 92 that are attached by fasteners 94.

Figure 7:
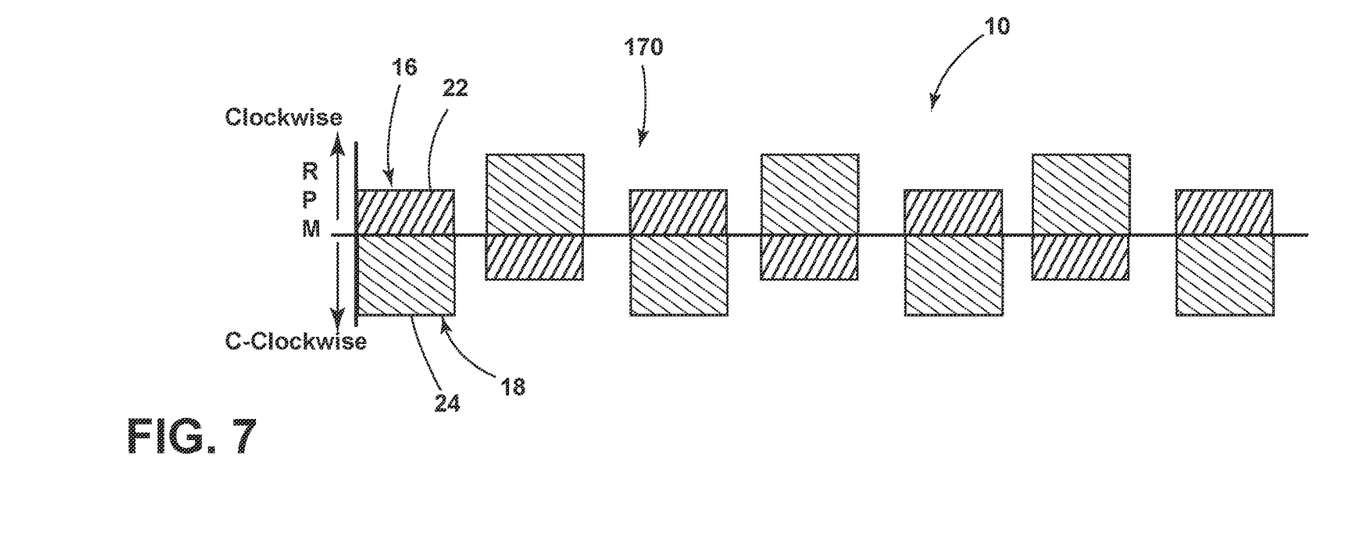
FIGS. 7 and 8 are schematic diagrams illustrating various operational configurations of the drum and the impeller using an aspect of the binary motor.
Figure 8:
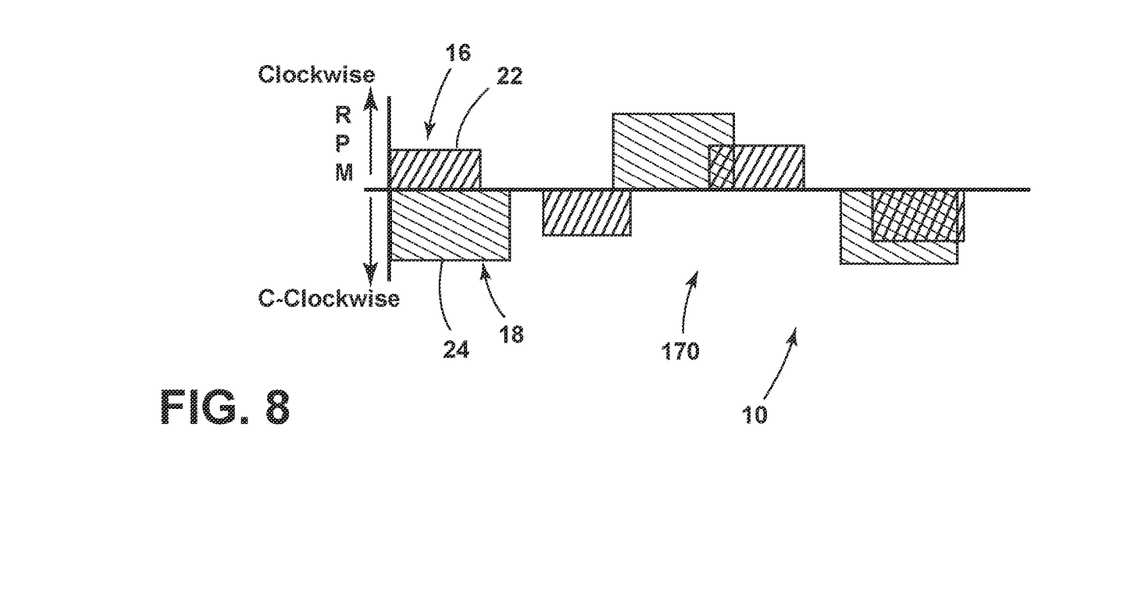
Figure 9:
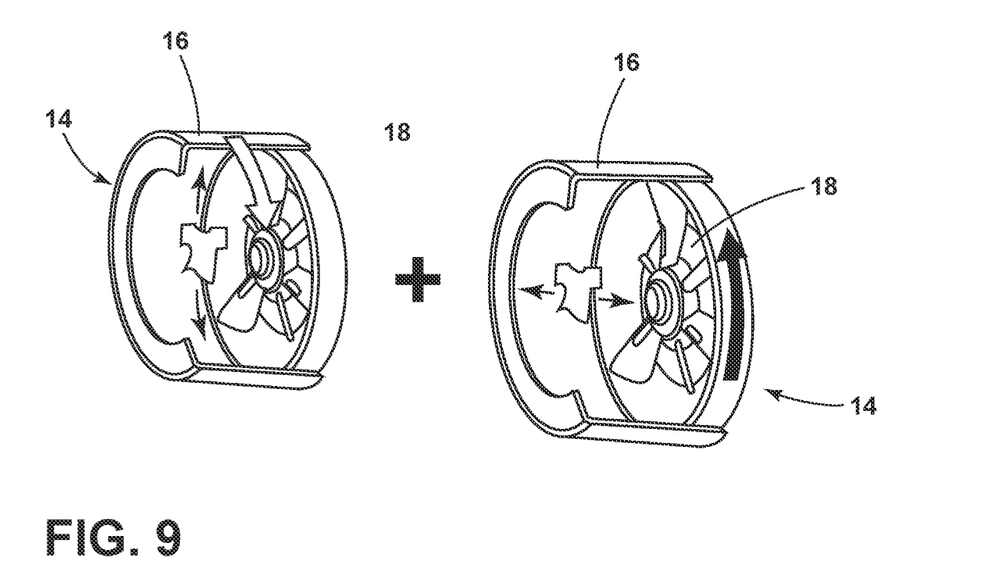
FIG. 9 is a schematic diagram illustrating clothing agitating conditions that can be performed by the drum and the impeller independently.
Figure 10:
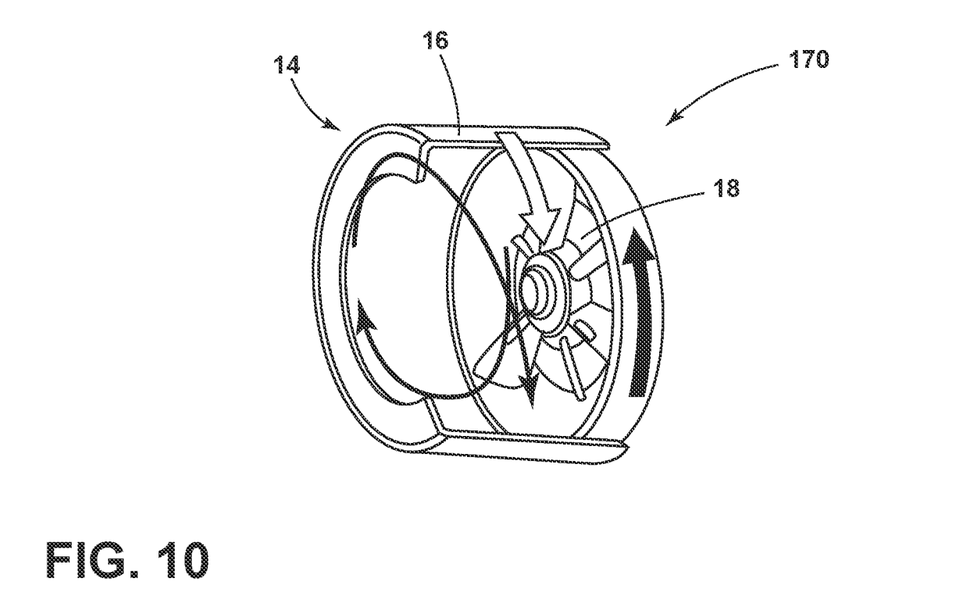
FIG. 10 is a schematic diagram illustrating a combined operation of the drum and the impeller to generate a multi-direction agitation of articles within the laundry appliance.

According to various aspects of the device, as exemplified in FIGS. 7 and 8, the first and second motors 22, 24 of the binary motor 10 can be operated in a selective and independent manner with respect to each other. Accordingly, each of the first and second motors 22, 24 and, in turn, the drum 16 and the impeller 18, can be operated at the same or different speeds as well as the same or different rotational directions. Accordingly, a myriad of agitating sequences 170 can be utilized through use of the binary motor 10 in connection with the first and second drive rotors 38, 40 of the drum 16 and the impeller 18. As exemplified in FIGS. 7 and 8, simultaneous operation of the drum 16 and impeller 18, exemplified in FIG. 7, can be utilized while altering the speed of the drum 16 and impeller 18 with respect to one another. As exemplified in FIG. 8, great variations in the rotational direction, rotational speed, and idle sequences of the drum 16 and impeller 18 can be utilized for providing a broad range of agitating sequences 170. This broad range of agitating sequences 170 can reduce wash time due to added mechanical action resulting from use of the binary motor 10. In addition, as exemplified in FIGS. 9 and 10, the combination of the rotational motion 64 of the impeller 18 and the drum 16 can cause a generally helical agitating pattern within the drum 16. This helical agitating pattern utilizes a combination of lateral and rotational movement of the items located in the drum 16 to achieve added mechanical action during the various agitating sequences 170.

According to various aspects of the device, the binary motor 10 can include separate inverters 180 that are each in communication with a controller 186 for independent operation of the first and second motors 22, 24 of the binary motor 10. Using the separate inverters 180, electrical power can be independently delivered to the first and second windings 182, 184 of the first and second motors 22, 24 within the common housing 26 of the binary motor 10. Accordingly, independent delivery of the electrical current allows for the independent and selective operation of the first and second motors 22, 24 of the binary motor 10, as well as the drum 16 and impeller 18 for the laundry appliance 14. In addition, various sensors can be incorporated within the first and second motors 22, 24 as well as the drum 16 and impeller 18, to provide information concerning the rotational positions of the first and second rotor and stator pair 66, 68. Sensors can also be utilized for sensing a respective position of each of the drum 16 and impeller 18 with respect to one another and with respect to the remainder of the appliance 14. While various sensors can be included, a sensorless configuration of the first and/or second motors 22, 24 are contemplated within the binary motor 10 and the appliance 14 at large.

Figure 4:
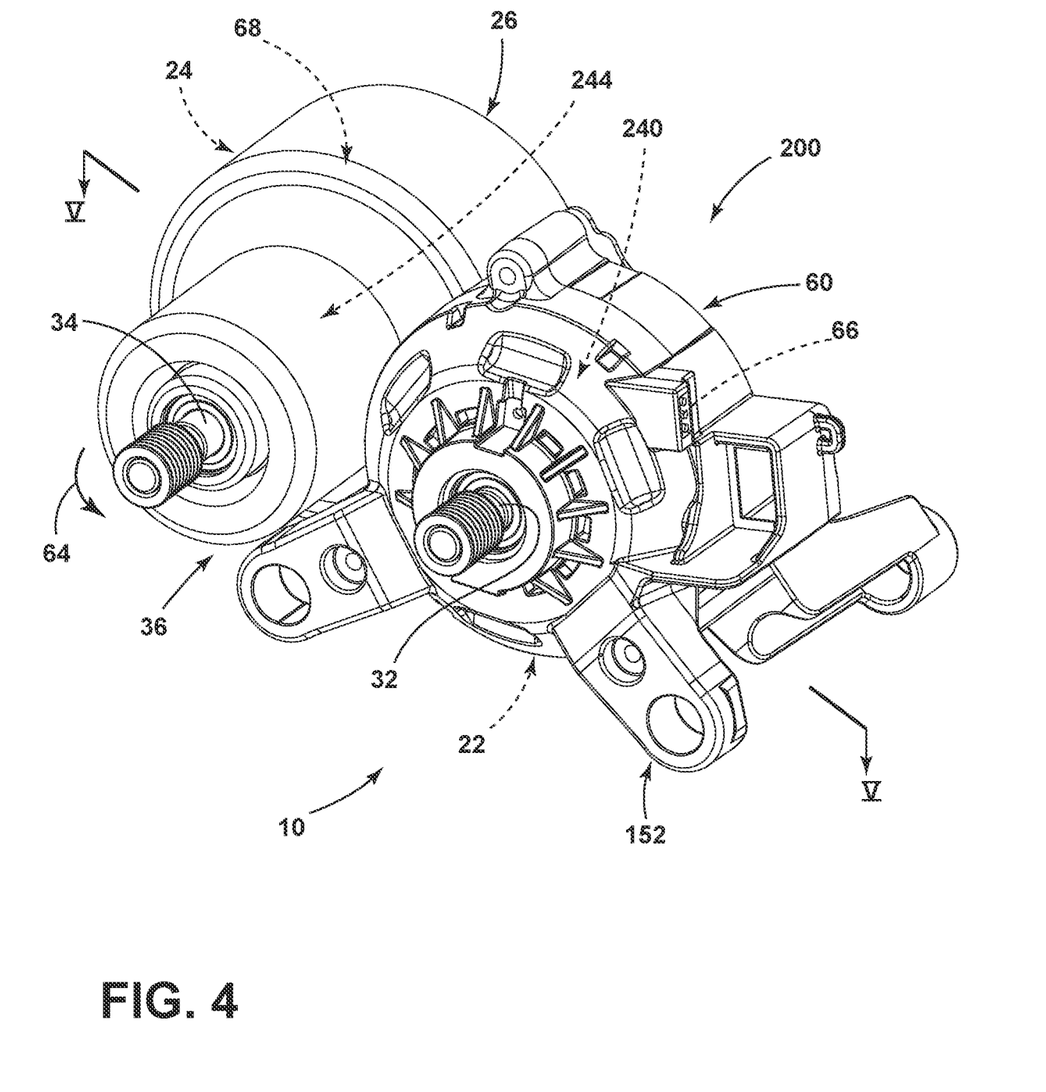
FIG. 4 is a perspective view of an aspect of the binary motor that incorporates an overlapping stator configuration.
Figure 5:
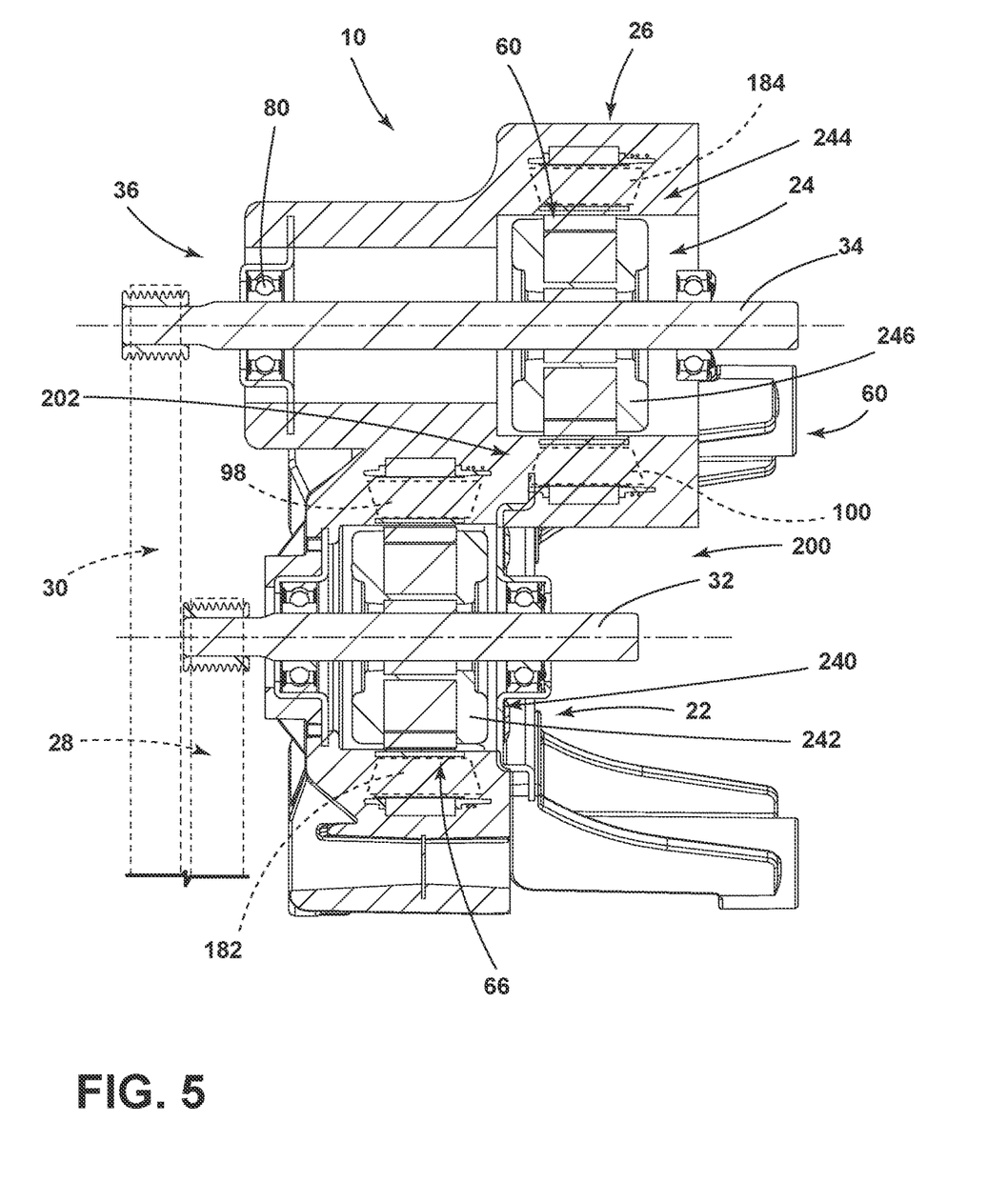
FIG. 5 is a cross-sectional view of the binary motor of FIG. 4, taken along line V-V.

Referring now to FIGS. 4 and 5, the first and second motors 22, 24 of the binary motor 10 can also be positioned in a staggered configuration 200 or slightly overlapping configuration with respect to one another so that the first and second drive shafts 32, 34 can each extend from the belt side 36 of the common housing 26. In this staggered configuration 200, the first and second stators 98, 100 of the first and second rotor and stator pairs 66, 68 at least partially overlap with one another to define an overlapping section 202. Stated another way, a portion of the first stator 98 for the first motor 22 and a portion of the second stator 100 for the second motor 24 are aligned with one another within the overlapping section 202 of the common housing 26. The first stator 98 of the first motor 22 is positioned within the common housing 26 and can be located proximate the belt side 36. The second stator 100 of the second motor 24 is positioned within the common housing 26 and can be located distal from the belt side 36 and proximate the opposing side 60. In this configuration, a cross section taken through the overlapping section 202 and taken between and parallel with the first and second drive shafts 32, 34 extends perpendicularly through each of the first stator 98 and the second stator 100. Accordingly, the compact configuration of the binary motor 10 can be accomplished by having the first and second motors 22, 24 be back-to-back, as exemplified in FIG. 3, or by having the first and second motors 22, 24 be offset and staggered configuration 200 within the overlapping section 202 as exemplified in FIGS. 4 and 5.

In this staggered configuration 200 of the first and second motors 22, 24, the first and second drive shafts 32, 34 can include different lengths to accommodate the staggered configuration 200 of the first and second stators 98, 100 and the offset placement of the first and second drive belts 28, 30. As discussed above, various bearing configurations are included within the common housing 26 to support the rotational motion 64 of the first and second drive shafts 32, 34, while axially securing each of the first and second drive shafts 32, 34 within the common housing 26. In the staggered configuration 200 of the first and second motors 22, 24, the first and second drive shafts 32, 34 are typically positioned on the belt side 36 of the common housing 26. Accordingly, the transfer shaft 62 may not be utilized or incorporated within the staggered configuration 200 of the binary motor 10. It is contemplated that the transfer shaft 62 can be utilized within certain aspects of the staggered configuration 200 of the binary motor 10, as well as the gear reduction functionality that can be provided by the transfer shaft 62.

Referring again to FIGS. 4 and 5, during manufacture of the staggered configuration 200 of the binary motor 10, the inside diameter of the first stator 98 for the first motor 22 typically does not overlap with the outside diameter of the second stator 100 for the second motor 24. This can be referred to as a partially overlapping configuration wherein the first and second stators 98, 100 partially overlap within the overlapping section 202. This configuration is typically utilized for molding purposes such that the molding compound can extend completely around the first and second stators 98, 100 for the respective first and second motors 22, 24 for the binary motor 10. While the first and second stators 98, 100 are staggered with respect to one another, there is a lateral overlap such that the circumference of the first stator 98 protrudes into the circumference of the second stator 100. Again, this staggered and overlapped configuration of the first and second motors 22, 24 allows for a compact configuration of the binary motor 10, where the overall width of the common housing 26 for the binary motor 10 can be less than the sum of the widths of the first and second stators 98, 100 in a conventional side-by-side configuration.

Figure 6:
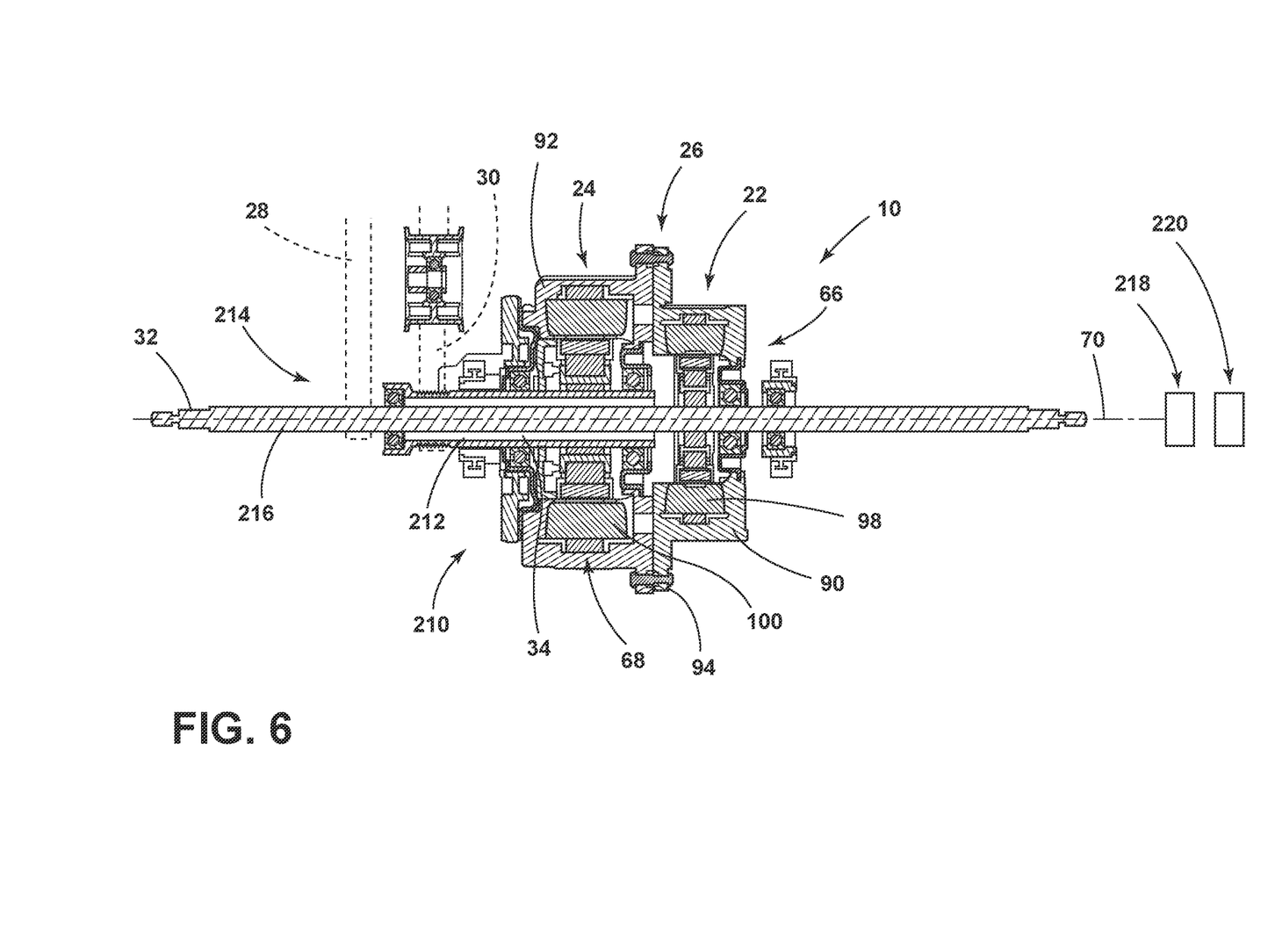
FIG. 6 is a cross-sectional view of an aspect of a binary motor, where one of the drive shafts for the binary motor includes a tube section that surrounds the second drive shaft of the binary motor.

Referring now to FIG. 6, the first and second drive shafts 32, 34 can be positioned concentric with one another. In such an embodiment, a hollow configuration 210 of one of the first or second drive shafts 32, 34 can be utilized. While one of the drive shafts is hollow (shown as the second drive shaft 34), it is used to surround the other of the first and second drive shafts 32, 34, which extends through the hollow drive shaft 212. Through this configuration, the first and second motors 22, 24 of the binary motor 10 can be aligned along the common rotational axis 70 and also extend in the same direction from the belt side 36 of the common housing 26. At the same time, the first and second drive shafts 32, 34 can be utilized for independent and selective operation of the first and second drive belts 28, 30, and, in turn, the drum 16 and the impeller 18 for the laundry appliance 14.

In this concentric configuration 214 of the binary motor 10, the common housing 26 can include the first and second portions 90, 92 that are attached, typically via fasteners 94, to one another. During assembly of the first and second portions 90, 92, the outer hollow drive shaft 212 and the inner solid drive shaft 216 can be assembled with respect to one another and coupled with the first and second motors 22, 24. In addition, use of the solid drive shaft 216 allows for each end of the solid drive shaft 216 to be coupled to a separate mechanical device. By way of example and not limitation, one end of the solid drive shaft 216 may be coupled to the first drive belt 28 and the other opposing end of the solid drive shaft 216 can be coupled to a fluid pump 218 or a blower 220. Other attachment configurations are able to be incorporated depending on the design of the appliance 14.

Referring again to FIGS. 1-3 and 11, the binary motor 10 includes the first stator 98 that is positioned within the common housing 26 and is located proximate the belt side 36 of the common housing 26. A first drive assembly 240 is in electromagnetic communication with the first stator 98 and includes a first rotor 242 and the first drive shaft 32. The first drive shaft 32 extends from the belt side 36 of the common housing 26 and is configured to engage the first drive belt 28. The second stator 100 is positioned within the common housing 26 and is located proximate the opposing side 60 of the common housing 26. A second drive assembly 244 includes at least the second rotor 246 and the second drive shaft 34, where the second drive shaft 34 extends from the second rotor 246. The second drive assembly 244 is configured to engage a second drive belt 30 proximate the belt side 36 of the common housing 26. In this manner, the second drive assembly 244 is configured to transfer the rotational motion 64 of the second motor 24 to the second drive belt 30 that is on the belt side 36 of the common housing 26. In certain aspects of the device, as exemplified in FIGS. 4 and 5, the second drive shaft 34 of the second drive assembly 244 extends from the belt side 36 of the common housing 26 to engage the second drive belt 30.

As exemplified in FIGS. 1-3 and 11, the second drive shaft 34 of the second drive assembly 244 extends from the opposing side 60 of the common housing 26. To transfer the rotational motion 64 of the second drive shaft 34 from the opposing side 60 to the belt side 36, the second drive assembly 244 includes the transfer shaft 62 that extends through the common housing 26 and couples the second drive shaft 34 with the second drive belt 30. The transfer belt 110 extends from the second drive shaft 34 to the transfer shaft 62, and the transfer shaft 62 extends through the common housing 26 to engage the second drive belt 30 on the belt side 36 of the common housing 26.

Figure 12:
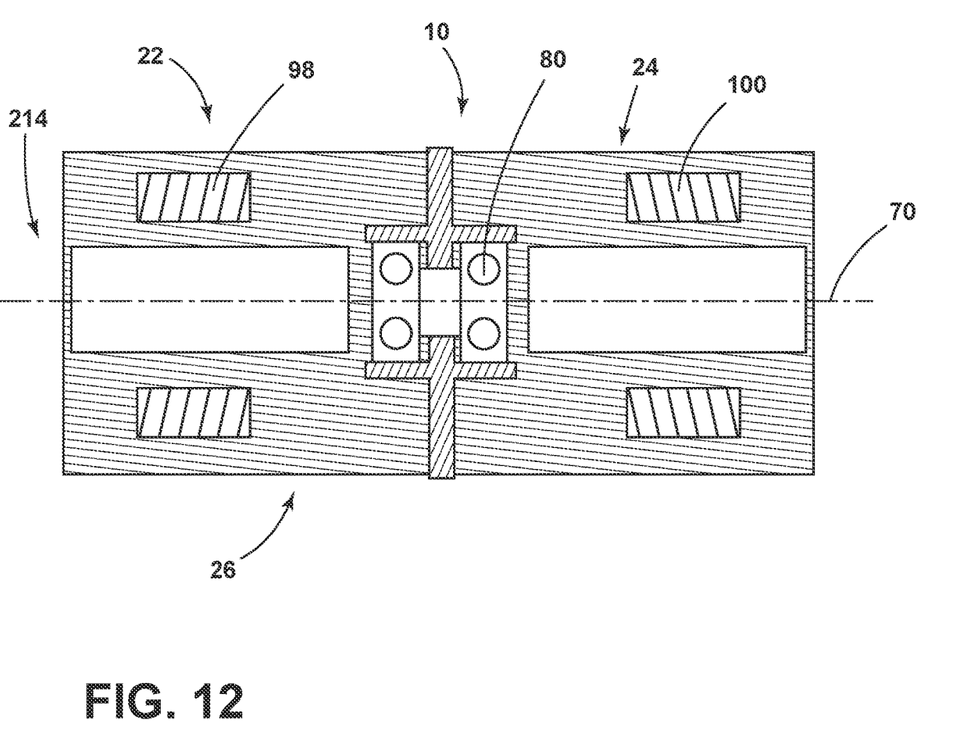
FIG. 12 is a cross-sectional view of an aspect of the binary motor.
Figure 13:
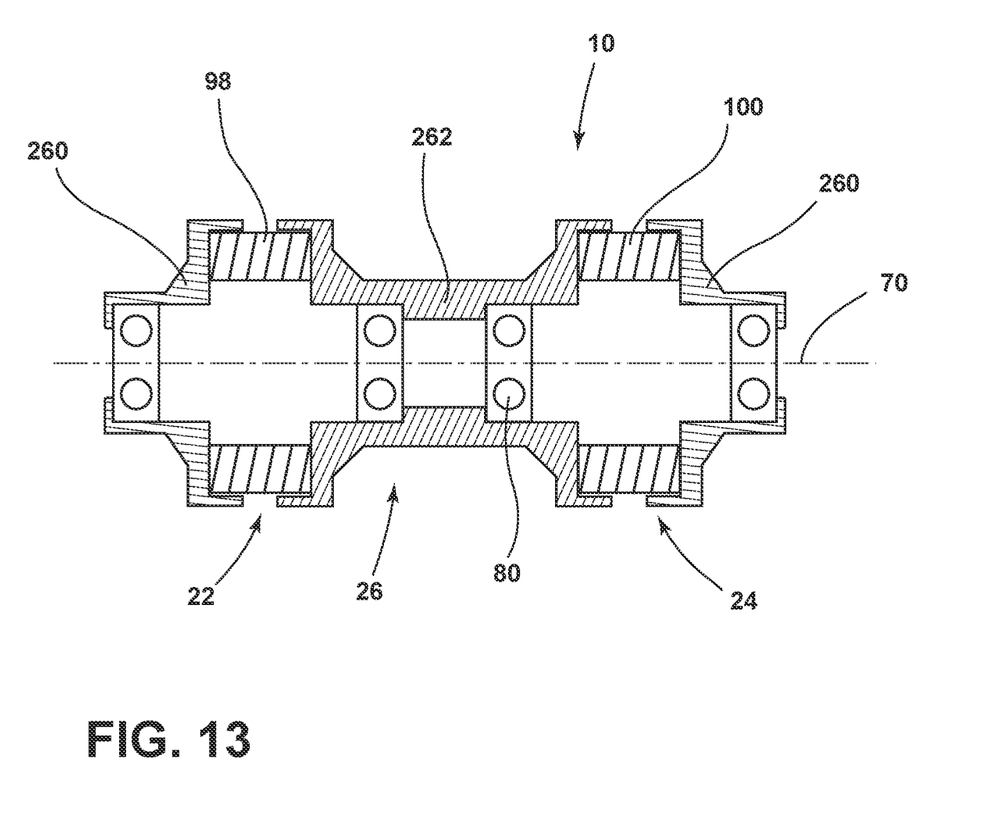
FIG. 13 is a cross-sectional view of an aspect of the binary motor having a multi-component common housing.

Referring now to FIGS. 12 and 13, the concentric configuration 214 of the binary motor 10 can include first and second drive shafts 32, 34 that are positioned in a back-to-back configuration, as exemplified in FIGS. 3 and 11. In addition, the concentric configuration 214 can include the hollow configuration 210 of at least one of the first and second drive shafts 32, 34 as exemplified in FIG. 6. In these aspects of the concentric configuration 214 of the binary motor 10, the configuration of the common housing 26 can vary depending on the particular design of the appliance 14 and the first and second motors 22, 24 that are installed within the common housing 26. In addition, the material of the common housing 26 can vary. As exemplified in FIG. 10, the common housing 26 can be at least partially formed of Bulk Molding Compound (BMC) that is overmolded around components of the first and second motors 22, 24. This can be in a common housing 26 that is made of multiple attached components or is made of a single and continuous common housing 26. In addition, the common housing 26 can include a multi-component assembly that is made of a metallic material, such as aluminum, aluminum alloys, other metals, composite materials, combinations thereof and other similar materials.

As exemplified in FIG. 13, the common housing 26 can include multiple components that are attached to the first and second stators 98, 100 and various bearings 80. These components can be coupled or attached together via the other components of the common housing 26 or can be attached via the components of the first and second motors 22, 24. By way of example and not limitation, the common housing 26 can include three or more separate components that each include various bearings 80. These components are then attached to the first and second stators 98, 100 to form the common housing 26. The common housing 26 can include opposing end bell portions 260 and a central bearing portion 262 that attaches the first and second stators 98, 100 together.

According to the various aspects of the device, the first and second rotor and stator pairs 66, 68 are positioned within the common housing 26 to allow for electromagnetic communication that produces the electromotive force for rotation the first and second drive shafts 32, 34. The placement of the first and second stators 98, 100 is also configured to prevent electromagnetic interference between the first and second motors 22, 24.

In each of these configurations, the binary motor 10 is configured to be attached to an outer surface 230 of the tub 12 at the mounting structure 150. Again, this binary motor 10 can be installed as part of the manufacturer of the original appliance 14. It is also contemplated that the binary motor 10 can be used as an aftermarket component or replacement motor for replacing a conventional direct drive motor or conventional belt drive motor. The mounting bracket 152 for the binary motor 10 is configured to engage the existing mounting structure 150 that is included with the tub 12 for the laundry appliance 14. Accordingly, the binary motor 10 can be attached to the drum 16 using the existing mounting structure 150 without the use of additional adapters or unique fasteners 94. Through this configuration, the insulation of the binary motor 10 is efficient and convenient and may require minimal time and effort.

According to various aspects of the device, the binary motor 10 can be used within various appliances 14. Such appliances 14 can include, but are not limited to, washers, dryers, combination washers and dryers, and other appliances 14 that require motorized operation of multiple components. It is also contemplated that the components that can be operated by the binary motor 10 can include, but are not limited to, the rotating drum 16, the impeller 18, blowers 220, compressors, fluid pumps, combinations thereof, and other similar motorized components that can be included within various commercial and residential appliances 14 and fixtures.

According to another aspect of the present disclosure, a laundry appliance includes a drum rotationally positioned within a structural cabinet. An impeller is rotationally positioned within the drum. The impeller is selectively and independently operable with respect to the drum. A binary motor has a first motor and a second motor disposed within a common housing. A first drive belt extends between the first motor and the drum. A second drive belt extends between the second motor and the impeller. The first and second motors engage the first and second drive belts on a belt side of the common housing.

According to another aspect, the first and second motors are positioned such that respective first and second drive shafts of the first and second motors are parallel with one another.

According to yet another aspect, respective first and second drive shafts of the first and second motors extend from the belt side of the common housing.

According to another aspect of the present disclosure, the first motor and the second motor are located in an offset and staggered configuration within the common housing to define an overlapping section of the common housing.

According to another aspect, a first stator of the first motor is positioned proximate the belt side of the common housing and a second stator of the second motor is positioned distal from the belt side of the common housing.

According to yet another aspect, a cross section through the overlapping section taken between and parallel with the first and second drive shafts extends perpendicularly through each of the first stator and the second stator.

According to another aspect of the present disclosure, the common housing is a single and continuous piece that is formed around the first and second motors.

According to another aspect, the first stator and the second stator are injection molded within the common housing.

According to yet another aspect, a tub that is coupled to the structural cabinet, wherein the drum rotationally operates within the tub, and wherein the binary motor is attached to the tub.

According to another aspect of the present disclosure, a laundry appliance includes a drum rotationally positioned within a structural cabinet. An impeller is rotationally positioned within the drum. The impeller is selectively and independently operable with respect to the drum. A binary motor includes a first motor and a second motor disposed within a common housing. A first drive belt extends between the first motor and the drum. A second drive belt extends between the second motor and the impeller. First and second drive shafts of the first and second motors extend from opposing sides of the common housing. The first and second drive belts are each positioned on a belt side of the common housing. A transfer shaft extends through the common housing and couples the second drive shaft with the second drive belt.

According to another aspect, the first and second motors are positioned such that the respective first and second drive shafts of the first and second motors are parallel with one another.

According to yet another aspect, a transfer belt connects the second drive shaft with the transfer shaft. The transfer belt transfers a rotational motion from the second drive shaft to the second drive belt via the transfer shaft.

According to another aspect of the present disclosure, the transfer shaft is positioned within a transfer housing that is attached to the common housing.

According to another aspect, the transfer shaft includes a gear reduction mechanism for providing greater output torque during operation of the second motor and the impeller.

According to yet another aspect, the gear reduction mechanism includes a receiving end and a delivery end of the transfer shaft. An outside diameter of the receiving end is larger than an outside diameter of the delivery end.

According to another aspect of the present disclosure, the first and second motors and the first and second drive shafts operate about a common rotational axis.

According to another aspect, the transfer shaft operates along a transfer rotational axis that is parallel with and offset from the common rotational axis.

According to yet another aspect, a motor for a laundry appliance includes a first stator positioned within a common housing proximate a belt side of the common housing. A first drive assembly includes a first rotor and a first drive shaft that extends from the belt side of the common housing. The first drive shaft is configured to engage a first drive belt. A second stator is positioned within the common housing proximate an opposing side of the common housing. A second drive assembly includes a second rotor and a second drive shaft that extends from the second rotor. The second drive assembly is configured to engage a second drive belt proximate the belt side of the common housing.

According to another aspect of the present disclosure, the second drive assembly includes the second drive shaft that extends from the belt side of the common housing.

According to another aspect, the second drive assembly includes the second drive shaft that extends from the second rotor to the opposing side of the common housing. The second drive assembly includes a transfer shaft that extends through the common housing and couples the second drive shaft with the second drive belt.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A laundry appliance comprising:
   a drum rotationally positioned within a structural cabinet;
   an impeller rotationally positioned within the drum, wherein the impeller is selectively and independently operable with respect to the drum;
   a binary motor having a first motor and a second motor disposed within a common housing;
   a first drive belt extending between the first motor and the drum; and
   a second drive belt extending between the second motor and the impeller, wherein the first and second motors engage the first and second drive belts on a belt side of the common housing.

2. The laundry appliance of claim 1, wherein the first and second motors are positioned such that respective first and second drive shafts of the first and second motors are parallel with one another.

3. The laundry appliance of claim 2, wherein the respective first and second drive shafts of the first and second motors extend from the belt side of the common housing.

4. The laundry appliance of claim 3, wherein the first motor and the second motor are located in an offset and staggered configuration within the common housing to define an overlapping section of the common housing.

5. The laundry appliance of claim 4, wherein a first stator of the first motor is positioned proximate the belt side of the common housing and a second stator of the second motor is positioned distal from the belt side of the common housing.

6. The laundry appliance of claim 5, wherein a cross section through the overlapping section taken between and parallel with the first and second drive shafts extends perpendicularly through each of the first stator and the second stator.

7. The laundry appliance of claim 5, wherein the common housing is a single and continuous piece that is formed around the first and second motors.

8. The laundry appliance of claim 7, wherein the first stator and the second stator are injection molded within the common housing.

9. The laundry appliance of claim 1, further comprising:
a tub that is coupled to the structural cabinet, wherein the drum rotationally operates within the tub, and wherein the binary motor is attached to the tub.

10. A laundry appliance comprising:
a drum rotationally positioned within a structural cabinet;
an impeller rotationally positioned within the drum, wherein the impeller is selectively and independently operable with respect to the drum;
a binary motor having a first motor and a second motor disposed within a common housing;
a first drive belt extending between the first motor and the drum;
a second drive belt extending between the second motor and the impeller, wherein first and second drive shafts of the first and second motors extend from opposing sides of the common housing, wherein the first and second drive belts are each positioned on a belt side of the common housing; and
a transfer shaft that extends through the common housing and couples the second drive shaft with the second drive belt.

11. The laundry appliance of claim 10, wherein the first and second motors are positioned such that the respective first and second drive shafts of the first and second motors are parallel with one another.

12. The laundry appliance of claim 10, wherein a transfer belt connects the second drive shaft with the transfer shaft, and wherein the transfer belt transfers a rotational motion from the second drive shaft to the second drive belt via the transfer shaft.

13. The laundry appliance of claim 10, wherein the transfer shaft is positioned within a transfer housing that is attached to the common housing.

14. The laundry appliance of claim 10, wherein the transfer shaft includes a gear reduction mechanism for providing greater output torque during operation of the second motor and the impeller.

15. The laundry appliance of claim 14, wherein the gear reduction mechanism includes a receiving end and a delivery end of the transfer shaft, wherein an outside diameter of the receiving end is larger than an outside diameter of the delivery end.

16. The laundry appliance of claim 10, wherein the first and second motors and the first and second drive shafts operate about a common rotational axis.

17. The laundry appliance of claim 16, wherein the transfer shaft operates along a transfer rotational axis that is parallel with and offset from the common rotational axis.

18. A motor for a laundry appliance, the motor comprising:
a first stator positioned within a common housing proximate a belt side of the common housing;
a first drive assembly that includes a first rotor and a first drive shaft that extends from the belt side of the common housing, wherein the first drive shaft is configured to engage a first drive belt;
a second stator positioned within the common housing proximate an opposing side of the common housing; and
a second drive assembly that includes a second rotor and a second drive shaft that extends from the second rotor, wherein the second drive assembly is configured to engage a second drive belt proximate the belt side of the common housing.

19. The motor of claim 18, wherein the second drive assembly includes the second drive shaft that extends from the belt side of the common housing.

20. The motor of claim 18, wherein the second drive assembly includes the second drive shaft that extends from the second rotor to the opposing side of the common housing, and wherein the second drive assembly includes a transfer shaft that extends through the common housing and couples the second drive shaft with the second drive belt.

* * * * *